United States Patent [19]

Toegel et al.

[11] Patent Number: 4,639,910

[45] Date of Patent: Jan. 27, 1987

[54] APPARATUS FOR ESTABLISHING COMMUNICATION PATHS

[75] Inventors: Herbert J. Toegel, Middlebury; Joseph R. Yudichak; John F. Gilsdorf, both of Madison, all of Conn.

[73] Assignee: ITT Corporation, New York, N.Y.

[21] Appl. No.: 682,228

[22] Filed: Dec. 14, 1984

[51] Int. Cl.⁴ .............................................. H04G 11/04
[52] U.S. Cl. ........................................ 370/58; 370/67; 370/85
[58] Field of Search ..................... 370/58, 67, 84, 85, 370/110.1

[56] References Cited

U.S. PATENT DOCUMENTS 3,982,077  9/1976  Clark et al. ........................ 370/84
3,995,118  11/1976  Chao ................................... 370/58
4,064,360  12/1977  Koenig ................................ 370/58
4,370,743  1/1983  Moran ................................. 370/67
4,389,720  6/1983  Baxter et al. ...................... 370/67
4,547,877  10/1985  Lehman et al. ..................... 370/58

Primary Examiner—Douglas W. Olms
Assistant Examiner—Wellington Chin
Attorney, Agent, or Firm—Peter C. Van Der Sluys; Robert A. Hays

[57] ABSTRACT

An apparatus for establishing a plurality of communication paths includes a plurality of ports each having different data rates associated therewith and a means for establishing simultaneous paths among the plurality of ports according to instruction signals from terminals interfaced with the ports and carried on the same path as the information to be switched.

24 Claims, 5 Drawing Figures

APPARATUS FOR ESTABLISHING COMMUNICATION PATHS

CROSS-REFERENCE TO RELATED APPLICATIONS

This application is related to the following U.S. patent applications: Ser. No. 682,030; Ser. No. 682,033; Ser. No. 682,034; Ser. No. 682,035; Ser. No. 682,038 all filed on even date herewith; and Ser. No. 722,894 filed on Apr. 12, 1985. All of the above applications are assigned to the assignee hereof. BACKGROUND OF THE INVENTION The present invention generally relates to an apparatus for establishing communication paths and, in particular, relates to such an apparatus having a plurality of ports and means for establishing communication paths in response to instructions provided via the ports.

The advent of data communication devices such as computer terminals, high speed printers and numerous other presently known data communication devices has resulted in somewhat of a dilemma for the telecommunication industry.

As well known, most present telecommunication networks are based on conventional circuit switched centrally controlled exchanges. One difficulty manifested by such centralized exchanges is that the entire network associated therewith experiences catastrophic failure when a malfunction or failure occurs in the centralized exchange. The occurrence of such a failure, regardless of the magnitude thereof, consequently adversly impacts a substantial portion, if not all, of the subscribers thereto. In addition, by being restricted to a circuit switched centralized exchange, any data transmission between any two subscribers thereto must traverse the centralized exchange. Further, such data transmissions are difficult to interface with and usually require modems to adapt the conventional telephone equipment with the signals required to operate data transmitting/receiving devices. Such modems are becoming more complex and difficult to build since the variety of data devices, as well as the data rates thereof is increasing. At the present time, the ideal solution would be to simply install entirely new switching systems, or exchanges that are capable of handling the variety of data types and rates. However, in many instances, such an installation would be quite wasteful since many present exchanges are still not near the end of their useful life.

One alternative to a centralized exchange is a switch network that has distributed control, such as, for example, the ITT System 12 Digital Exchange. In that particular architecture, a plurality of terminal interfaces interconnect with a digital switching network, the digital switching network is provided to establish communication paths between different terminal interfaces. Each terminal interface autonomously sets up communication paths between and among all subscribers connected thereto as well as paths through the digital switching network when a subscriber interconnected to another terminal interface is called. One significant advantage of an exchange having distributed control is that the catastrophic failure of the entire exchange is avoided in the event of the failure of any single component thereof. That is, if one or more terminal interfaces fail those remaining active can still utilize the digital switching network, or in the event that the entire digital switching network fails the terminal interfaces nevertheless provide complete local service to the subscribers thereto.

Since present exchanges are generally adapted to accept only a limited number of different types of devices, it is clear that by providing an exchange having distributed control the expansion thereof, to accommodate all present and future data services, can be modular in nature without requiring the expensive redesign of an entire exchange.

Consequently, it is quite apparent that with the growth and variation of data devices, and the anticipated continued growth of same, some apparatus that interfaces with present communication systems and provides substantial data communication services without requiring the elimination of presently existing exchanges is in demand. In addition, such an apparatus is needed whereby the piggybacking of a completely separate data communication system in addition to the circuit switched exchanges already in existence is unnecessary.

SUMMARY OF THE INVENTION

Accordingly, it is one object of the present invention to provide an apparatus for establishing communication paths that is adapted to not only be controlled by the external peripherals thereto, but also is adapted to handle any present or anticipated future terminal device.

This object is accomplished, at least in part, by an apparatus having means of establishing communication paths without regard for the type or manner of information transfer intended.

Other objects and advantages will become apparent to those skilled in the art from the following detailed description read in conjunction with the appended claims and the drawings attached hereto.

DETAILED DESCRIPTION OF THE INVENTION

Figure 1:
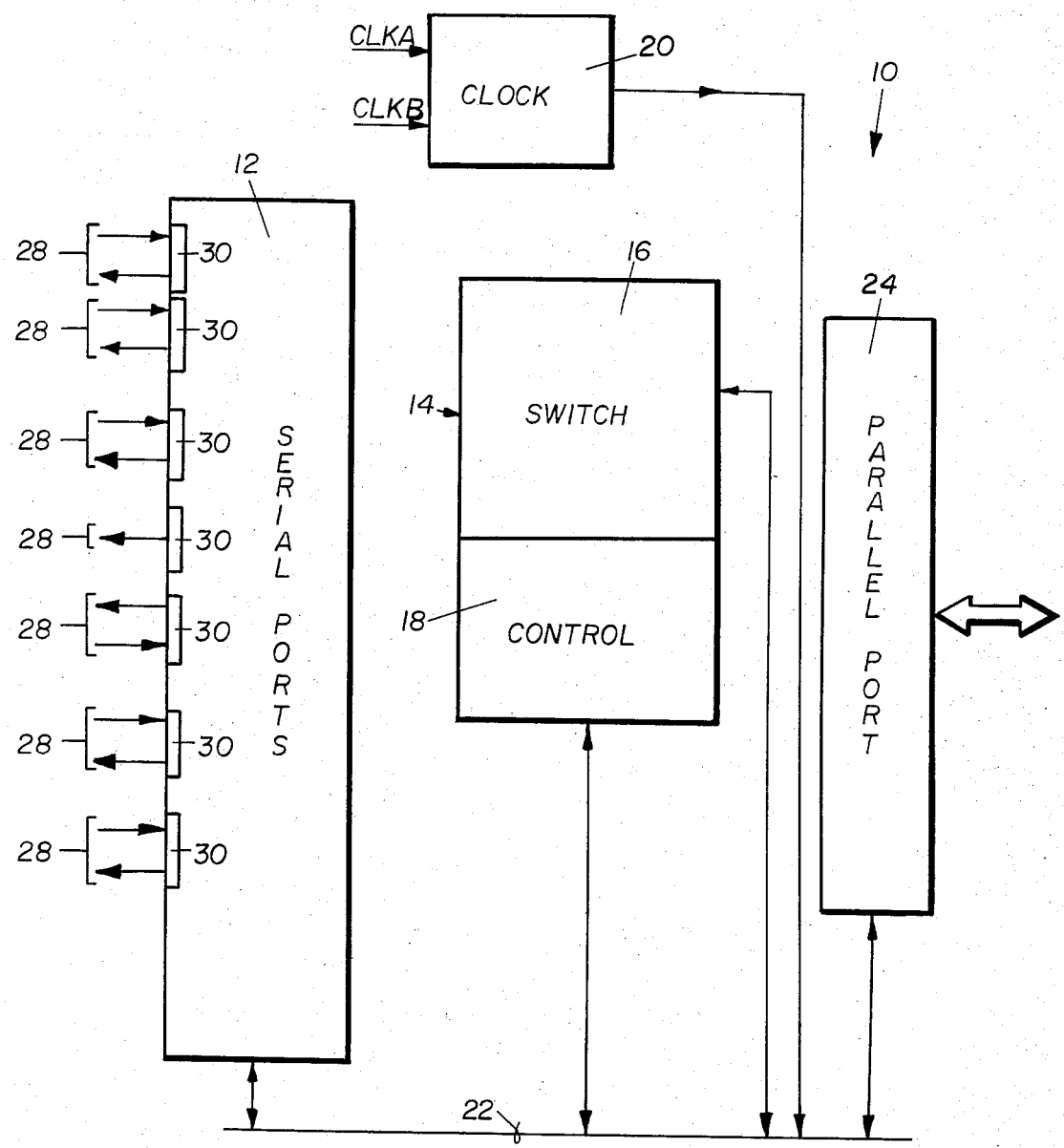
FIG. 1 is a block diagram of an apparatus embodying the principles of the present invention.

An apparatus, embodying the principles of the present invention and generally indicated at 10 in FIG. 1 in the drawings, includes a means 12 for interfacing with a plurality of external terminals (not shown in FIG. 1), a means 14 for establishing a plurality of communication paths, the means 14 including a switch 16 and a switch controller 18, and a means 20 for regulating the transfer of information along an internal communication bus 22. The apparatus 10 further includes a means 24 for interfacing with at least one microcomputer 26.

In one preferred embodiment, the means 12 for interfacing with a plurality of external terminals includes a number of serial ports 28 each including serial-to-parallel input converters, and parallel-to-serial output converters 30 as well as intermediate buffers 32 to synchronize data transfer to and from the internal bus 22.

Figure 2:
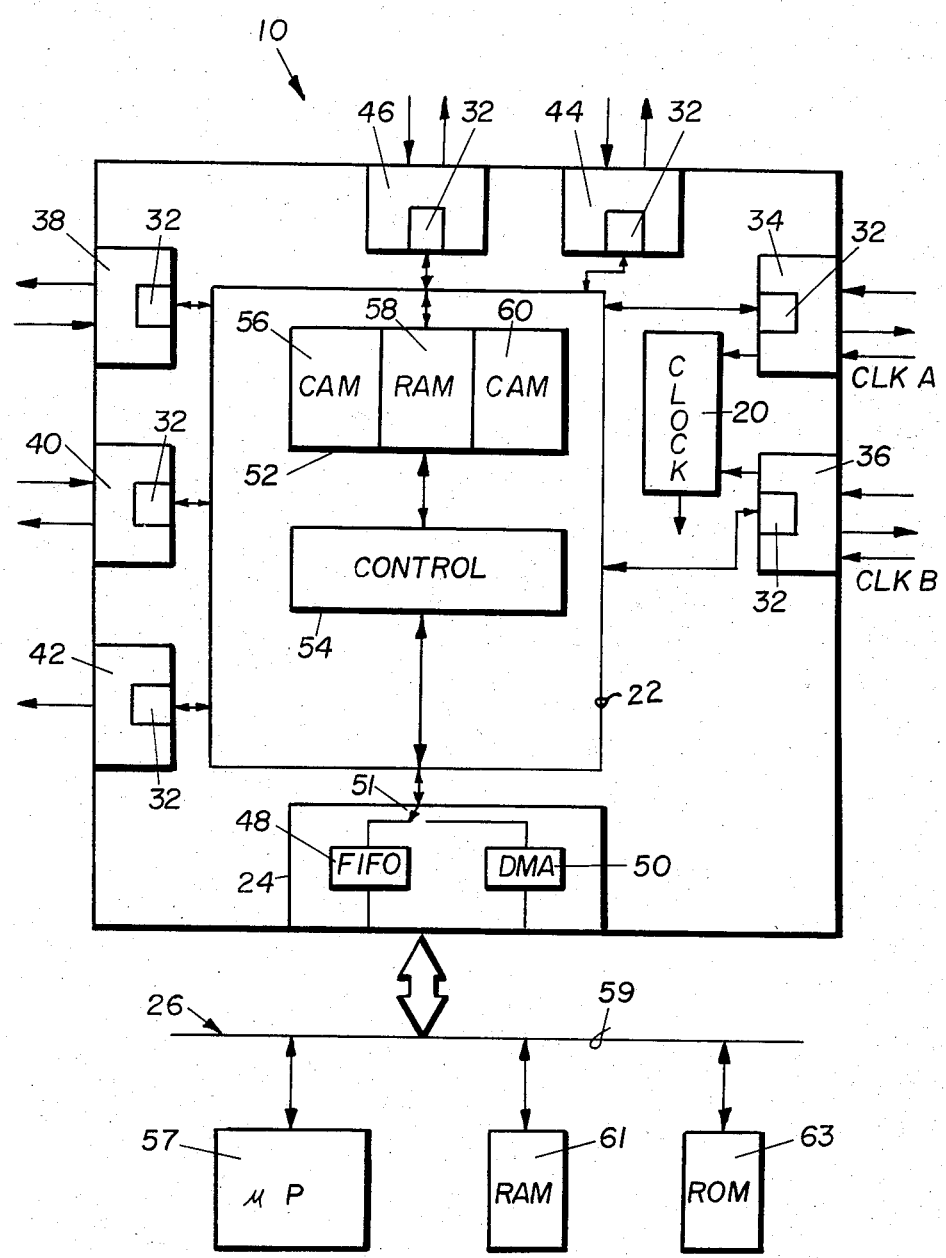
FIG. 2 is a more detailed block diagram of one embodiment of the apparatus shown in FIG. 1.

In one specific embodiment, shown in FIG. 2, there are seven serial ports 28 including first an second full duplex ports, 34 and 36 respectively, compatible with CCITT standard pulse coded modulation signals and are considered asynchronous with respect to each other. The first and second full duplex ports, 34 and 36 respectively, are included to provide communication system redundancy. Further, each of the ports, 34 and 36, is provided with its own synchronizing clock input, designated at CLKA and CLKB of which one clock is selected as an input to the information transfer regulating means 20. In addition, the first and second full duplex ports 34 and 36 respectively, include a plurality of bidirectional communication channels. For example, there can be 32 channels per port, each channel being capable of handling a bit rate greater than 4 MHz.

The apparatus 10 further includes third and fourth full duplex ports, 38 and 40 respectively, and a fifth simplex serial port 42. The third and fourth duplex ports, 38 and 40 respectively, and the fifth simplex port 42 interface directly with subscriber terminals, such as telephone subsets, computer terminals, or the like, and can include a variety of bit rate capabilities. The third and fourth duplex ports, 38 and 40 respectively, and the fifth simplex port 42 also have a number of independent channels. These ports, 38, 40 and 42, can be adapted to support a variety of bit rates whereby the apparatus 10 is provided with compatibility with substantially all presently available data devices as well as anticipated devices.

In addition, sixth and seventh duplex ports, 44 and 46, respectively, each having one channel per data frame are provided so that the variety of commercial devices connectable to the apparatus 10 is extended without regard to word boundaries at, for example, a 64K baud rate or a 128K baud rate. These particular ports are thus capable of transferring data thereacross in what is effectively a continuous fashion to the relatively slower peripherals interconnected thereto, i.e. at either 8 or 16 bits for each 125 microsecond frame.

The serial ports 28 interconnect with a time division multiplexed (TDM) internal bus 22 that supports the flow of data traffic throughout the apparatus 10. The TDM data bus 22 is preferably organized with time slots equal to the input clock (i.e. CLKA or CLKB) period with 512 time slots per frame. Each frame is divided into 32 channels each channel having 16 time slots. A number of time slots per channel, for example five, are, in one embodiment, dedicated to command and control signals. Each time slot can support 16 bits of information. One command and control scheme for establishing paths is described and discussed in U.S. patent application Ser. No. 682,030, entitled "Switch Controller" filed on even date herewith and assigned to the assignee hereof. The above-mentioned application is deemed incorporated herein by reference. In this manner, the apparatus 10 is provided with "in-channel" signalling for establishing a plurality of communication paths without a separate or dedicated control link to some external means.

Additionally, a parallel interface port 24 is interconnected to the TDM bus 22 which interface port 24 is adapted to interface with either an 8 or 16 bit microcomputer 26.

The means for interfacing 24 with a microcomputer 26 includes, in the preferred embodiment, a first-in-first-out memory device 48 and/or a direct memory access transfer device 50. One such interface 24 is described in detail in U.S. patent application Ser. Nos. 682,034 and 682,035, respectively entitled "Interface for Direct Data Transfer" and "Adaptive Interface for Use With a Microcomputer", both filed on even date herewith and assigned to the assignee hereof. Both of the immediately aforementioned patent applications are deemed fully incorporated by reference herein.

In one preferred embodiment, the interface 24 includes both the first-in-first-out, or buffer, memory device 48 and the direct memory access transfer device 50 and means 51 for selecting the mode of operation. One advantage of providing these interface devices, 48 and 50, is for the convenience of subscribers. More to the point, in many instances where cost is the consideration, a less expensive microcomputer could be chosen. Usually, such a less expensive microcomputer may not be provided with the necessary bus control, interrupt and channel attention signal that are necessary for the utilization of the direct memory access transfer device 50. In such an instance, the first-in-first-out memory device 48 would become activated according to a pre-designated control signal. Regardless, the microcomputer 26 includes a microprocessor portion 57 having a local bus 59, a random access memory 61 (RAM) and a read only memory (ROM) 63 interconnected thereto.

In the preferred embodiment, the means 14 for establishing a plurality of communication paths includes a scratch pad memory 52 and a means 54 for controlling the scratch pad memory 52.

In one embodiment the scratch pad memory 52 includes a destination content addressable memory 56 (CAM), a random access memory 58 (RAM) into which the actuaL data to be transferred is stored, and a source content addressable memory 60 (CAM). The means 54 for controlling such a CAM/RAM/CAM memory 52 includes a plurality of command registers responsive to command signals prefacing all information via the plurality of ports 28 or port 24. As a result, any channel of any port that provides a correct command request signal can become a command source and thereafter is capable of either entering or extracting data to, or from, the CAM/RAM/CAM scratch pad memory 52 and the various registers associated therewith. One particular implementation of the switch portion 16 of the path establishing means 14 is discussed in more detail in U.S. patent application Ser. Nos. 682,033 and 682,030, entitled "Apparatus and Method for Providing Dynamically Assigned Switch Paths" and "Switch Controller" respectively, filed on even date herewith and assigned to the assignee hereof. The above identified patent applications are hereby deemed incorporated herein by reference.

In one specific mode of operation, upon receiving a command or a request for becoming a command source, the particular channel of the particular port providing that request becomes a command source, and upon instructions therefrom the transfer of data is carried out through the RAM portion of the CAM/RAM/CAM. The transfer being between a port having its address located in the source CAM to a port having its address located in the destination CAM. It should be noted that any channel, once becoming a command source, can set up a path, which path does not necessarily include itself. In addition, once having become a command source, the particular channel can break down or otherwise control the transfer of data across the switch 16. Such a mechanism is particularly useful in the event of a malfunction that is observed at a port or on a channel other than where the malfunction occurs whereupon the detecting peripheral or terminal can assume command status and reroute traffic until the malfunctioning channel or port is re-established.

The means 20 for regulating the transfer of information along the TDM bus 22 includes a master clock for the bit by bit transfer of frames along the TDM bus 22 and synchronizes that transfer between the switch controller 18 and the switch 16.

Figure 3:
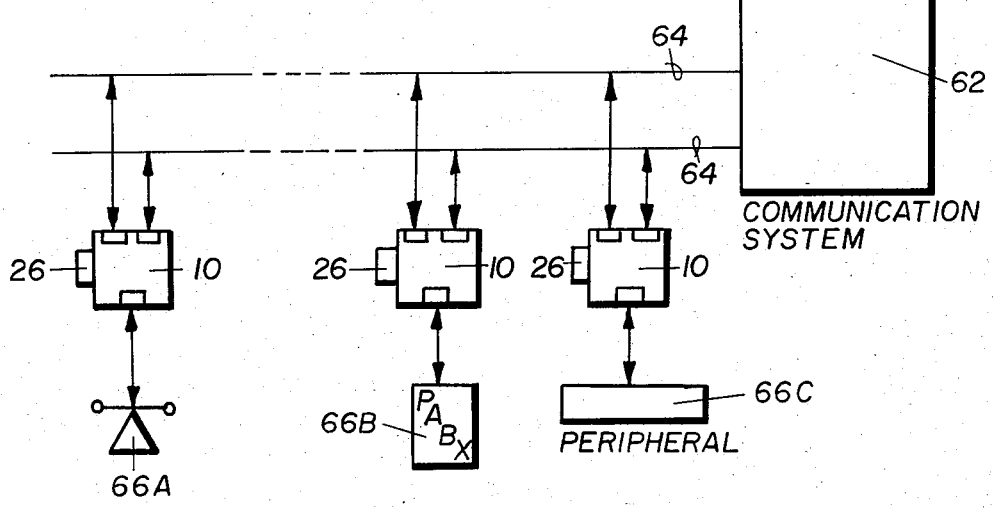
FIG. 3 is a block diagram of a communication system employing the apparatus shown in FIGS. 1 and 2.

In a particular implementation, as shown in FIG. 3, a communication system 62 has, as an interconnection thereto, a number of links 64 to which are connected a number of apparatuses 10. In addition, each apparatus 10 supports a plurality of peripheral devices 66. For example, a plurality of telephone circuits, 66A, a private automatic branch exchange, 66B, or a plurality of data terminals, 66C. In the arrangement shown, the first and second ports, 34 and 36 respectively, are each connected to one of the links 64 and the remainder of the serial ports (not shown in FIG. 3) interconnect with the subscriber peripheral equipment. In one scheme, to avoid collision errors, each apparatus 10 is assigned only certain prespecified channels associated with each link 64. Further, one of the links 64 could be dedicated to transmitting messages and, for example, interconnected with only first ports 34 and the other link 64 dedicated to receiving messages and interconnected with only second ports 36. In addition, the arrangement may further include the use of a microcomputer 26 as well as other data devices interconnecting thereto. In addition, as an alternative scheme, a bus contention or arbitration algorithm can be included to avoid collision errors.

Figure 4:
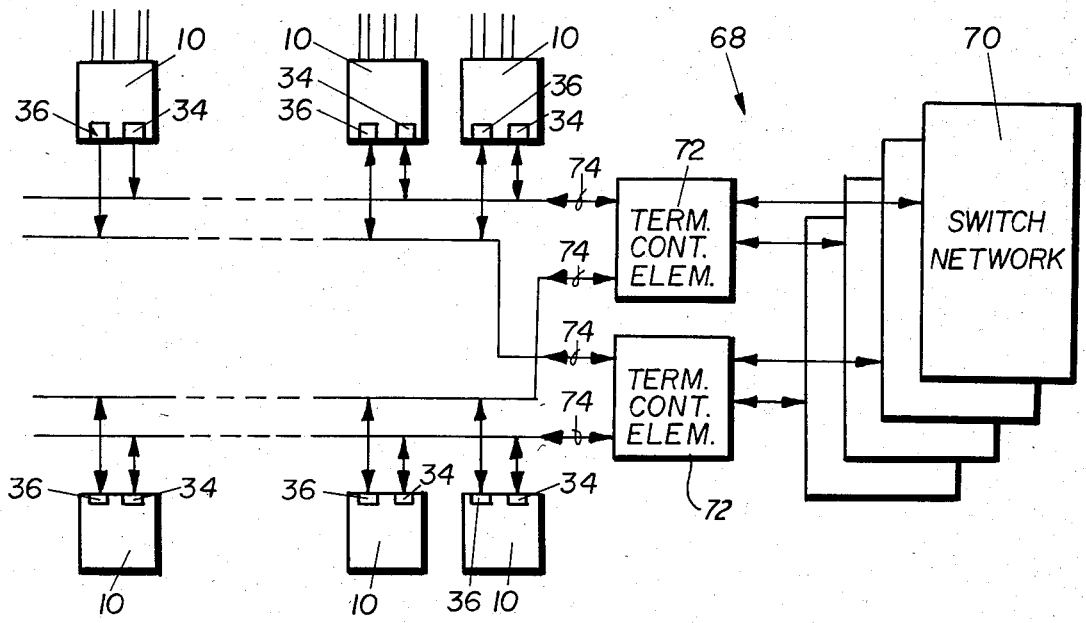
FIG. 4 is a block diagram of a distributed control communication system employing the apparatus shown in FIGS. 1 and 2.

Referring now to FIG. 4, there is shown a communication system 68 which in this embodiment is a distributed control digital exchange having a digital switching network 40 and a plurality of terminal control elements 72 interconnected thereto. Each terminal control element 72 includes, for example, a full 32 channel p.c.m. links 74. In addition, for example, in the instance where the digital switching network 70 is an ITT System 12 Digital Exchange, the terminal control element 72 provides both clock and frame synchronization signals to each apparatus 10 whereupon the transfer of data is controlled by the terminal control element 72 which establishes the network paths according to its own command and control structure.

One major advantage derived from the apparatus 10 in such a communication system 68 is that the terminal control elements 72 can be provided with additional protection against subscriber inconveniences. To wit, each subscriber interfacing with the System 12, via the apparatus 10 can be effectively interfaced with two terminal control elements 72. As shown in FIG. 4, each apparatus 10 has the first port 34 thereof interconnected to its respective terminal control element 72 and the second port 36 thereof interconnected with another terminal control element 72. Hence, if either terminal control element 72 were taken out of service, for example for software updating, the subscribers thereto would communicate with the switching network 70 via the other terminal control element 72. Hence, full terminal control element redundancy is provided to every subscriber.

Figure 5:
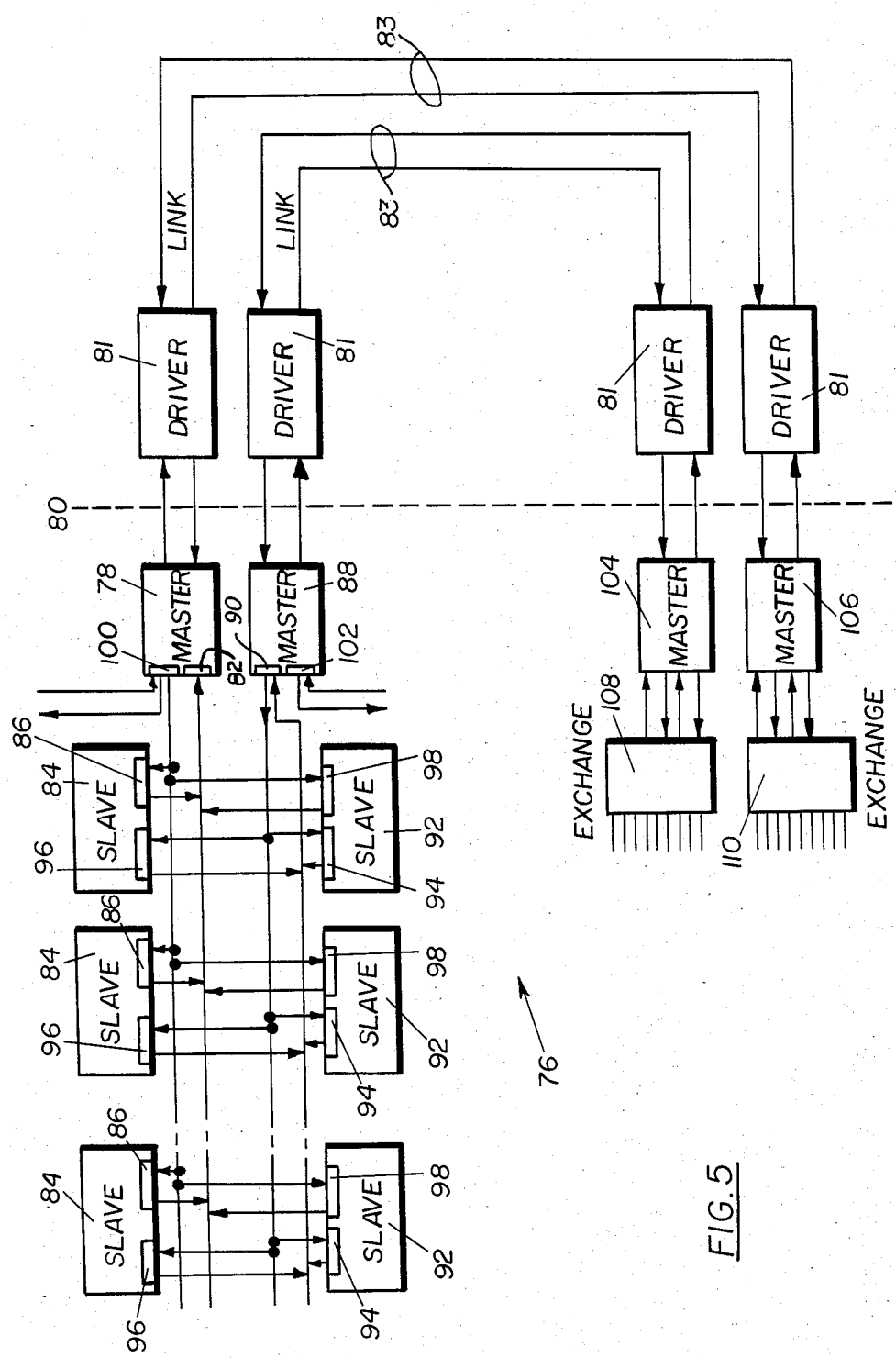
FIG. 5 is a block diagram of another communication system employing the apparatus shown in FIGS. 1 and 2.

Another communication system 76, shown in FIG. 5 includes a first master apparatus 78 interconnected to a communication link 80. As shown, a typical communication link 80 includes line drivers 81 and various trunks 83. The first port 82, i.e. a multichannel pcm port, has a plurality of slave apparatus 84 connected thereto via the corresponding full duplex multichannel first ports 86 thereof. Further, a second master apparatus 88 can also be interconnected to the communication link 80. The first port 90 thereof, i.e. a full duplex multichannel pcm link, has a second plurality of apparatus 92 connected thereto via the corresponding first ports 94 thereof. To avoid the need to provide collision detection or bus arbitration, each first port, 86 or 94, is assigned one channel of the respective master first port, 82 or 90, respectively. Hence, by the above scheme, the number of slave apparatus, 84 or 92, associated with a given master apparatus, 78 or 88 respectively, cannot exceed the number of channels of the first ports, 82 or 90, respectively, thereof. In addition, to provide full redundancy the full duplex multichannel second ports, 96 and 98, of the slave apparatus, 84 and 92 respectively, are, preferably, interconnected to the first ports, 90 and 82, of the other master apparatus, 88 and 78, respectively. The second ports, 100 and 102, respectively, of each master apparatus, 78 an 88 respectively, can interconnect with other slave apparatus, or exchanges, or the like.

The communication link 80 can further include a third and fourth master apparatus, 104 and 106 respectively, shown herein interconnecting with local exchanges, 108 and 110, respectively, each serving a plurality of subscribers.

Although the present invention has been described herein, with respect to particular embodiments, other configurations and arrangements may be developed without departing from the spirit and scope of the present invention. Consequently, the present invention is deemed limited only by the appended claims and the reasonable interpretation thereof.

What is claimed is:

1. An apparatus for establishing communication paths comprising:
   a plurality of duplex ports;
   a switch, said switch having a switch controller associated therewith and
   means for conveying information and instructions between said ports and said switch, said conveying means is a single internal TDM bus, said internal TDM bus interconnecting said switch with all of said duplex ports, said instructions being provided via any said duplex ports and conveyed via said internal TDM bus, whereby communication paths across said switch can be established according to said instructions.

2. Apparatus as claimed in claim 1 wherein said conveying means is adapted to accept said information and instruction from the same one of said duplex ports.

3. Apparatus as claimed in claim 1 wherein each one of said duplex ports has a plurality of channels associated therewith and said conveying means is adapted to accept said information and instructions from any one of said channels.

4. Apparatus as claimed in claim 3 wherein said information and instructions are conveyed via one of said channels.

5. Apparatus as claimed in claim 1 wherein one of said duplex ports is a parallel port.

6. Apparatus as claimed in claim 5 wherein said parallel port includes:
   a first-in-first-out data transfer device whereby data can be transferred to and from said internal TDM bus in a first-in-first-out manner via said parallel port.

7. Apparatus as claimed in claim 6 further comprising:
a direct data transfer device whereby data can be transferred to and from said internal TDM bus in a direct memory access fashion via said parallel port.

8. Apparatus as claimed in claim 5 wherein said parallel port includes:
a direct data transfer device whereby data can be transferred to and from said internal TDM bus in a direct memory access fashion via said parallel port.

9. Apparatus as claimed in claim 8 wherein said apparatus further includes:
a microcomputer, said microcomputer interfacing to said internal TDM bus of said conveying means via said parallel port.

10. Apparatus as claimed in claim 1 wherein said plurality of duplex ports are serial ports, each said serial port including a serial-to-parallel input converter, a parallel-to-serial output converter and an intermediate buffer whereby data transfer between each said duplex port and said internal TDM bus can be synchronized.

11. Apparatus as claimed in claim 10 wherein said plurality of duplex ports include first and second full duplex ports each having a plurality of bidirectional pulse coded modulation channels.

12. Apparatus as claimed in claim 11 wherein said first and second duplex ports operate at a bit rate greater than 4 MHz.

13. Apparatus as claimed in claim 11 wherein said plurality of duplex ports further include a third and a fourth full duplex ports each having a plurality of bidirectional channels.

14. Apparatus as claimed in claim 13 wherein said third and fourth ports operate at a bit rate of either 4 MHz or 2 MHz.

15. Apparatus as claimed in claim 13 further includes a fifth simplex port.

16. Apparatus as claimed in claim 15 wherein said plurality of duplex ports further include sixth and seventh duplex ports, said sixth, and seventh duplex ports being adapted to operate at a bit rate of either 64 or 128 KHz.

17. Apparatus as claimed in claim 1 further comprising:
means for regulating information transfer between said conveying means and said switch said regulating means including a master clock that synchronizes the bit by bit transfer of frames between said internal TDM bus and said switch.

18. A communication network comprising:
at least one apparatus for establishing a plurality of communication paths, said apparatus having a switch, a switch controller, a plurality of duplex ports and means for conveying information and instruction there among according to said instructions carried via said information conveying means said conveying means is a single internal TDM bus, said internal TDM bus interconnecting said switch with all of said duplex ports, said instructions being provided via any said duplex ports and conveyed via said internal TDM bus whereby communication paths across said switch can be established according to said instructions.

19. Network as claimed in claim 18 wherein said communication system includes:
a digital switch; and
a plurality of terminal elements interconnected thereto, said terminal elements being interconnected between said digital switch and said apparatus.

20. System as claimed in claim 19 wherein said terminal elements is adapted to establish communication paths across said digital switch according to a terminal element command and control instruction set.

21. A communication network comprising:
a first master apparatus, said master apparatus including a plurality of duplex ports, a switch, a switch controller and means for conveying information and instructions information conveying means, said conveying means is a single internal TD, bus, said internal TDM bus interconnecting said switch with all of said duplex ports, said instructions being provided via any said duplex ports and conveyed via said internal TDM bus
whereby communication paths across said switch can be established according to said instructions.

22. Network as claimed in claim 21 wherein said master apparatus includes at least one full duplex multichannel port, said full duplex multichannel port having a first plurality of said slave apparatus interconnected thereto.

23. Network as claimed in claim 22 wherein said master apparatus further comprises a second full duplex multichannel port having a second plurality of said slave apparatus interconnected thereto whereby communication among and between said first and said second plurality of apparatus can be established.

24. Network as claimed in 22 wherein each said slave apparatus is associated with only one channel of said multichannel port of said master apparatus.

* * * * *